United States Patent [19]
Hoppe

[11] Patent Number: 5,762,594
[45] Date of Patent: Jun. 9, 1998

[54] PROGRAMMABLE MACHINE TOOL WITH AUTOMATIC TOOL CHANGER

[75] Inventor: Gerd Hoppe, Habichtswald, Germany

[73] Assignee: Deckel Maho GmbH, Germany

[21] Appl. No.: 579,973

[22] Filed: Dec. 28, 1995

[30] Foreign Application Priority Data

Dec. 28, 1994 [DE] Germany .................. 44 46 963.2

[51] Int. Cl.$^6$ .................................................. B23Q 3/157
[52] U.S. Cl. ............................ 483/56; 483/32; 483/37; 483/63; 483/67; 409/224
[58] Field of Search ..................... 483/54, 55, 56, 483/57, 1, 32, 37, 63, 66, 67; 409/224

[56] References Cited

U.S. PATENT DOCUMENTS

| | | | |
|---|---|---|---|
| 3,998,127 | 12/1976 | Romeu | 409/224 |
| 4,119,213 | 10/1978 | Sato et al. | 483/67 |
| 4,122,598 | 10/1978 | Pegler et al. | 483/54 |
| 4,344,221 | 8/1982 | Pagani | 483/67 |
| 4,602,901 | 7/1986 | Ramusino | 483/32 |
| 4,644,635 | 2/1987 | Murai et al. | 29/568 |
| 4,999,895 | 3/1991 | Hirose et al. | 29/33 P |
| 5,052,089 | 10/1991 | Gadaud et al. | 29/27 R |
| 5,117,552 | 6/1992 | Babel | 483/36 |
| 5,364,329 | 11/1994 | Line | 483/67 |

FOREIGN PATENT DOCUMENTS

| | | | |
|---|---|---|---|
| 0060638 | 9/1982 | European Pat. Off. | B23Q 3/157 |
| 1552475 | 1/1971 | Germany | 483/63 |
| 9305653.2 | 10/1994 | Germany | B23B 11/08 |
| 57-156142 | 9/1982 | Japan | 483/56 |
| 6-114666 | 4/1994 | Japan | 483/67 |

*Primary Examiner*—A. L. Pitts
*Assistant Examiner*—Christopher Kirkman
*Attorney, Agent, or Firm*—Baker, Maxham, Jester & Meador

[57] ABSTRACT

A program-controlled machine tool with automated tool changing, where the machine tool consists of a motor-driven machining unit with a working spindle that can be moved in at least one coordinate. The machine tool also includes a work table that can be driven by a motor in at least one coordinate, at least one tool magazine, and a programmable control unit. In order to be able to carry out tool changing operations without any auxiliary equipment, especially without a tool changer, within a short period of time, the tool magazine is mounted in a certain spatial arrangement with the working area of the machining unit so that its changing position can be approached directly by the working spindle in order to carry out the tool changing operation.

40 Claims, 3 Drawing Sheets

PROGRAMMABLE MACHINE TOOL WITH AUTOMATIC TOOL CHANGER

BACKGROUND

1. Field of the Invention

This invention concerns a programmable machine tool with automatic tool changing, where the machine tool consists of a stationary machine column, a cross slide that can move in two horizontal coordinates on the machine column, a vertical milling head mounted on the front side of the cross slide so it can move in the vertical coordinate, a work table mounted on the machine column, a tool magazine with the tools aligned vertically, a changing station located in the approach area of the milling head, and a programmable control unit.

2. Discussion of the Related Art

With conventional machine tools, special tool changers are generally used for automatic changing of the various tools. The tool changers remove the proper tool from the magazine, convey it to a given position in front of the working spindle and transfer it to the spindle and vice versa. However, these tool changers are technically complicated and expensive because of the numerous activation and movement operations. In addition, they take up additional space on the machine tool and necessitate considerable control technology which can have a negative effect on the operating costs as well as the transfer times.

European patent A-0 060,638 discloses an automatic tool changing system for machine tools, where a tool magazine is mounted on one or both sides of a work table which can move horizontally on a substructure so the tool mounts are accessible only from above. Each tool magazine has its own rotary operating mechanism and is mounted on the substructure together with the work table so it can be driven in such a way that its changing station can be advanced to the axis of a working spindle which can move vertically. A used tool is inserted into a free tool mount by means of a lowering movement of the working spindle, and then a newly selected tool can be inserted into the working spindle after an appropriate rotating movement of the tool magazine. Although no separate tool changers are needed with this known changing system, it has the disadvantages of relatively long changing time and limited magazine capacity.

In addition, German utility patent 93 05 653.2 describes a generic machine tool with a so-called traveling column designs where a work table and a motor-driven cross slide, which move in two horizontal coordinates, are mounted on a rigid stationary machine frame, with a motor-driven vertical milling head mounted on the front side of the cross slide in such a way that it can move in the vertical coordinate. A chain magazine with vertical tool mounts is mounted on the slide which moves in the longitudinal direction of the machine frame. This chain magazine surrounds the slide and is covered on the front side of the slide by a protective hood and is at least partially movable. To change a tool, the traveling column moves in the transverse direction (Y-axis) on the slide until the axis of the working spindle is exactly above the central changing station of the magazine. After opening the protective hood, a used tool can be inserted into a free tool mount in the changing station by means of a lowering movement of the milling head. After a vertical upward movement of the milling spindle, the chain magazine can be advanced until the next tool is in the changing station. This new tool can be inserted into the spindle and secured there by means of a subsequent lowering movement of the milling head with the working spindle. Then the new tool secured in the working spindle is extracted from the tool mount of the magazine by a short horizontal movement, whereupon the working operation can be started with this new tool. It is obvious that these transfer operations described above require a relatively long period of time. In addition, with this known changing system, a multitude of parts is needed, which leads to high construction costs.

SUMMARY OF THE INVENTION

A major purpose of this invention is to create a programmable machine tool with automated tool changing that will permit rapid changing of tools with a reduced cost for the construction and the control technology.

This object is achieved according to this invention by the fact that the machine tool has two disk-type magazines that are mounted together on a supporting structure which is in turn mounted on the machine column on one side of the working area next to the work table. One of the disk magazines is provided to receive the used tool from the working spindle and the other disk magazine is provided for introducing a new tool into the working spindle.

Using two separate disk magazines assures adequate tool storage capacity and the side arrangement of the two disk magazines on one side of the work table promotes short changing times, because then the changing stations of the two magazines are close together and can be reached in succession by the working spindle within a short travel time. The use of two disk magazines according to this invention makes it possible for an empty tool mount to be in the changing station of one magazine while at the same time—before the start of a tool changing operation—a tool mount containing the new tool to be inserted is already in the changing station of the other tool magazine. This avoids the movements of the tool magazine during a changing operation that were necessary with the magazines known in the past, so the changing times are greatly shortened and the construction costs and control technology can be reduced to a minimum.

To change a used tool, the working spindle is driven horizontally to just in front of the changing station of one magazine which then has an empty tool mount. Before or during this approaching movement, the height of the tool is adjusted by an appropriate axial displacement of the working spindle in such a way that the tool can be inserted radially into this empty tool mount in the magazine. After the fastening devices inside the spindle are released, there is a short upward movement of the working spindle, so the process of transferring the used tool to the magazine is concluded. Then, the working spindle is advanced in the direction of the changing station of the second magazine containing the new tool, until the axis of the spindle is aligned with the axis of the tool mount in this changing position or the nose of the tool inside it. By means of a lowering movement of the working spindle, the nose of the tool becomes engaged with the nose mount inside the spindle and the fastening devices there are activated. By means of a short vertical movement to release the working spindle and a subsequent horizontal movement in the direction of the radial coordinate of the magazine, the new tool is released from the second magazine, whereupon a machining operation can be performed on the work piece.

An important operational aspect of this invention is that the working spindle can reach the changing stations of the two disk magazines, which are positioned relatively close together, one after the other from a short distance, so an empty tool mount in one magazine and the new tool to be introduced in the other magazine are made available even before the start of a changing operation. Thus, no special independent tool changers with grippers are needed for changing tools.

Although the two disk magazines arranged side by side are designed so they can be driven by motor in the direction of the spindle axis, in other words, vertically, it is useful, in order to achieve further simplification of the design, for the working spindle to execute the axial movements required to engage and release the nose of the tool.

According to a useful development of this invention, the two disk magazines can be rotated incrementally by means of separate drive units about an angle of rotation which is determined by the number of tool mounts, where this drive unit may have a stepping motor, a so-called Maltese cross (Geneva gearing mechanism) or some other suitable stepping device. The use of Geneva gearing consisting of simple and inexpensive parts in turn makes it possible to use economical electric motors which may be manufactured in large numbers, with optional worm gear, as used in windshield wiper drives for motor vehicles.

An important advantage of the machine tool according to this invention consists of the fact that tool changing can be accomplished with a simple design and with the least possible programming, so the operating personnel need not have extensive knowledge of programming.

Furthermore, due to the design of the disk magazine, especially due to the fact that the column is mounted so it can rotate—in contrast with a stationary supporting structure—the supporting structure offers the advantage of being approximately at the same level as the horizontal work table, while the magazine disks are at a high enough level to be able to accommodate even long tools and to minimize the vertical movements to be executed by the working spindle.

BRIEF DESCRIPTION OF THE DRAWING

Other advantages and details of the machine tool according to this invention appear in the following description of one design example with reference to the figures, which show the following.

DETAILED DESCRIPTION OF THE PREFERRED EMBODIMENTS

Figure 1:
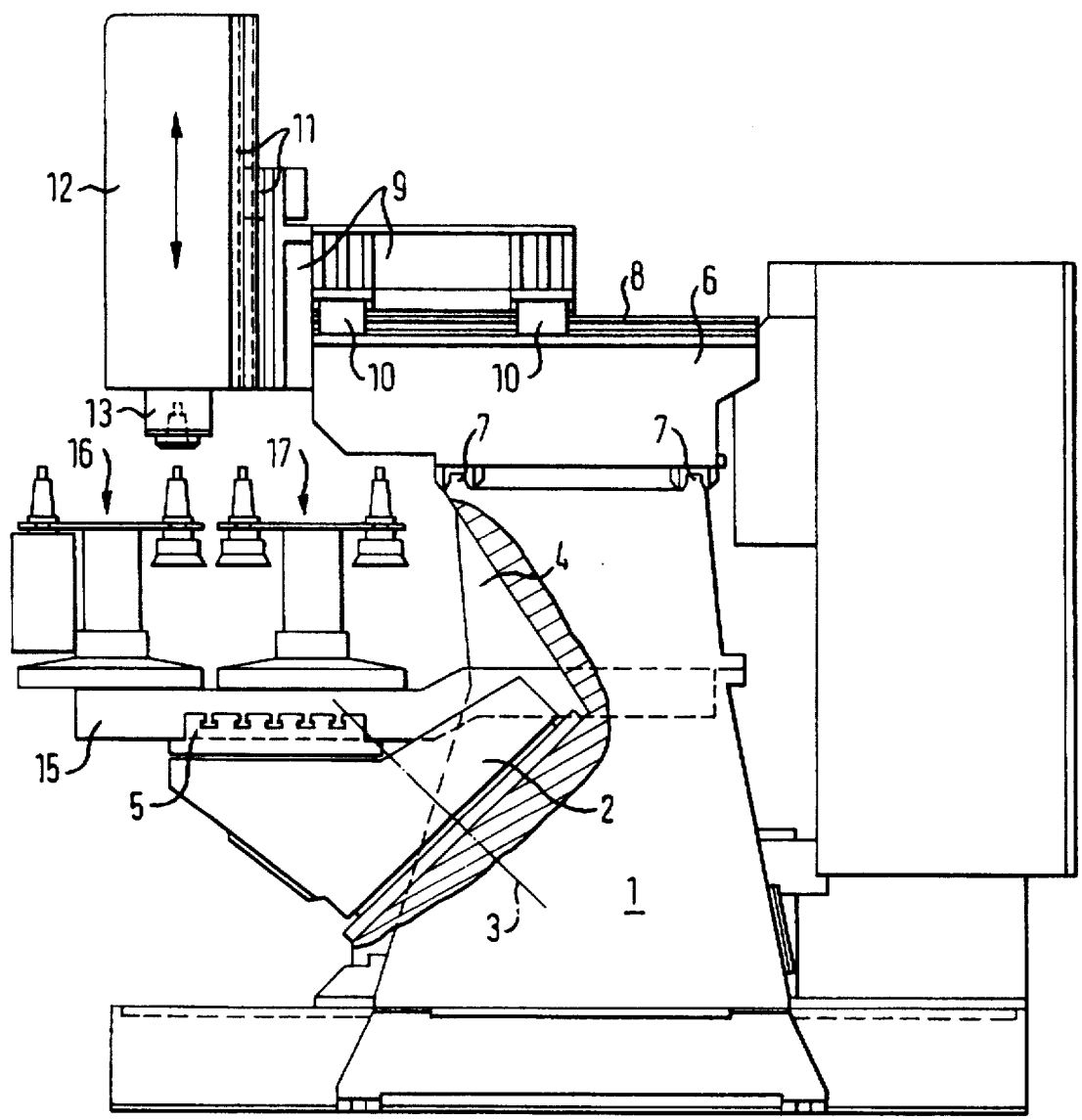
FIG. 1 is a schematic side view of a machine tool constructed in accordance with the invention.

The machine tool diagramed schematically in a side view in FIG. 1 includes column 1 as a supporting structure, with console 2 mounted in recess 4 on the front side so it can rotate about axis 3 tilted at a 45° angle. Rotatable circular table 5 is mounted on a side supporting shoulder of console 2. Slide 6 is arranged on the top of column 1 so it can travel in guide rails 7 at right angles to the plane of the drawing in FIG. 1. This longitudinal slide 6, which is preferably designed with a U-shaped cross section, contains guide rails 8 that run in the plane of the drawing in FIG. 1 and have cross slide 9 that is guided horizontally on them by means of guide shoes 10. The drive motors and transmission elements for the traversing movements of the parts mentioned above are not shown in FIG. 1. Straight guide 11 consisting of guide rails and guide shoes is provided on the front side of cross slide 9 for securing and guiding vertical milling head 12 which has working spindle 13 and a drive motor with built-in gear. With the help of guides 7, 10 and 11, the working spindle can be driven by motors in the three coordinates, in other words, in two dimensions in the horizontal plane and vertically.

In FIG. 1, a rigid horizontal support 15 that projects forward is rigidly mounted on the column behind work table 5, and two tool magazines 16 and 17, shown here as disk magazines, are mounted on this support. Each of these disk magazines has rotary table 21 mounted on the upper end of column 20—as shown especially in FIG. 3A—with tool mounts 22 provided at regular intervals on the outer perimeter (see also FIG. 2). These tool mounts are used to hold tools 23 (shown with dash-dot lines in FIG. 3) with nose 24 of the tools pointing upward. Tool mounts 22 that are in the shape of a circular segment each have a total of three projections 25 that extend inwardly to support the ring collar, usually on the wider end of the nose of the tool, where other devices 26 for centering the nose of the tool and preventing it from turning are also provided in the area of these projections 25.

Figure 3A:
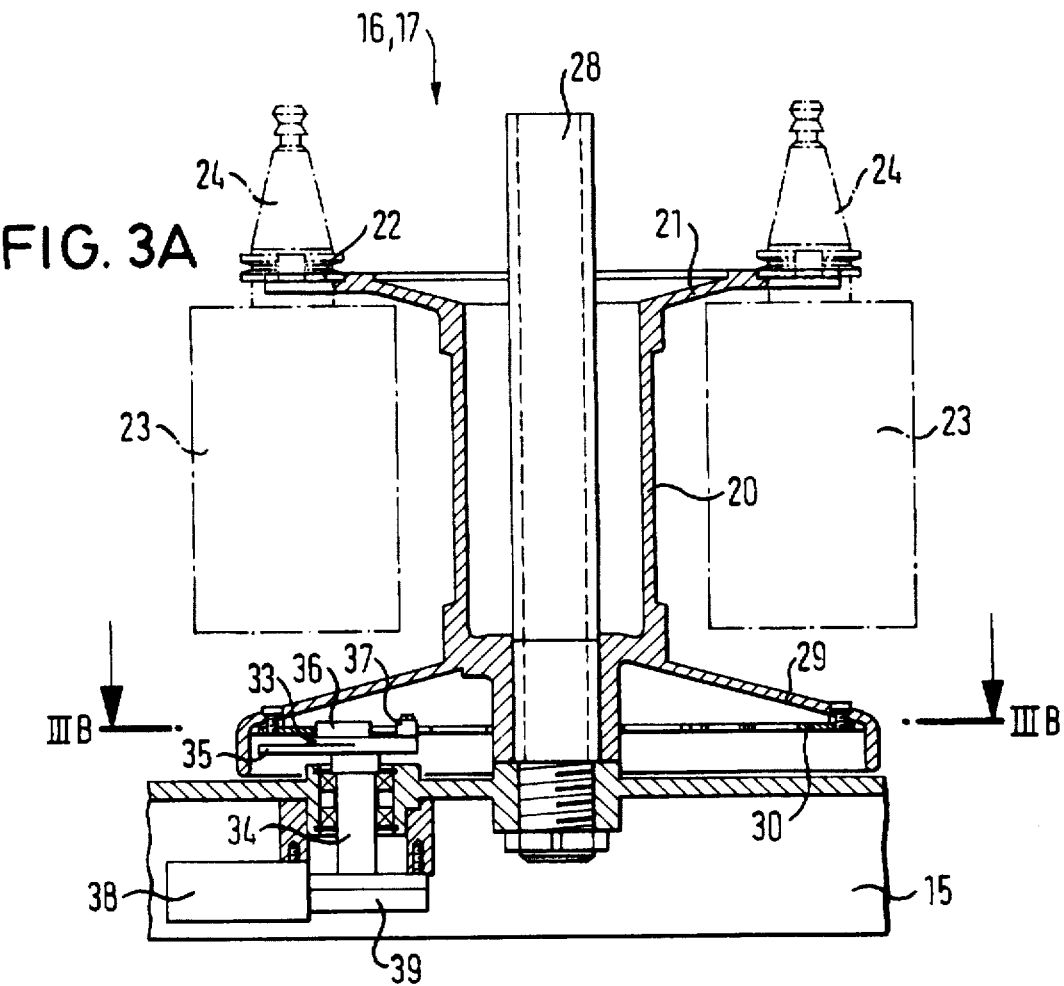
FIG. 3A and 3B respectively show an axial sectional view of a tool magazine for the machine tool of FIG. 1, and a partially cut-away top view of its Geneva gearing.

In the design illustrated in FIG. 3A, column 20, shaped as a hollow cylinder, is mounted, at least at its lower end, so it can rotate on vertical cylindrical bar 28 whose lower end is in turn rotatably mounted in horizontal support 15. Furthermore, conical disk 29 with a vertical outside edge is provided on the lower end part of column 20 and has ring wheel 30 mounted in its interior by means of bolts, for example. The inside of this ring wheel has a number of short radial slots 31 to match the number of tool mounts, and semicircular recesses 32 are provided between the slots (see FIG. 3B). This ring wheel 30 forms a part of a so-called Maltese cross or Geneva gearing for incremental rotation of column 20 with the tool mounts 22. The drive part of this Geneva gearing forms rotating link 33 which is illustrated in FIG. 3A and whose shaft 34 is mounted in horizontal support 15. At its upper end, the link has disk 35 on which end driving pin 37 and approximately semicircular driving element 38 are attached, so they alternately engage in radial slots 31 and approximately semicircular recesses 32 as shaft 34 rotates, thus inducing the stepwise rotation of ring wheel 30. Shaft 34 of rotating link 33 is driven by motor 38 (mounted in horizontal support 15) and worm gear 39.

Figure 2:
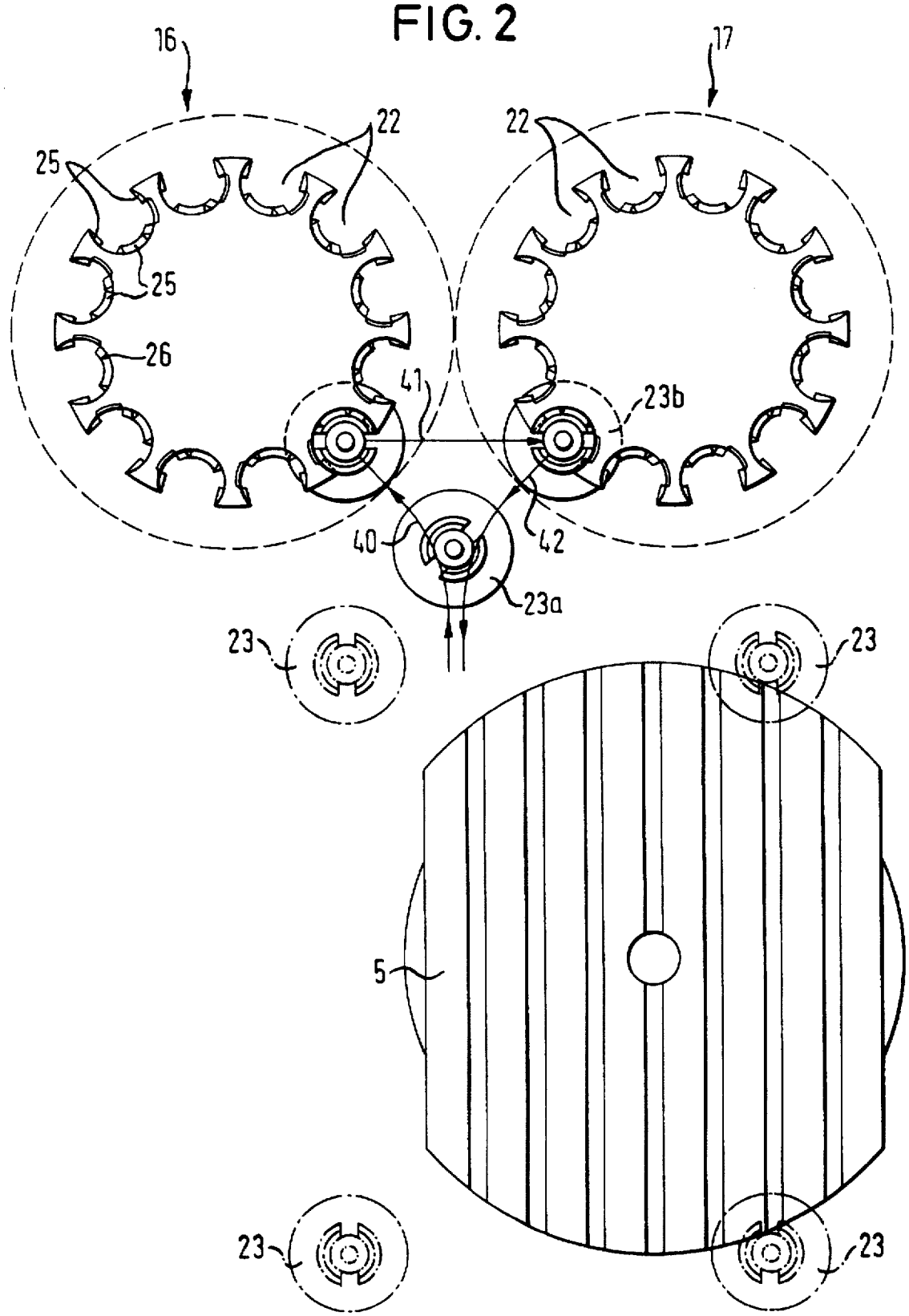
FIG. 2 is a top view of the work table with the working area of the tool spindle and two tool magazines of the invention, with the path traveled by the working spindle indicated by arrows in a tool changing operation.
Figure 3B:
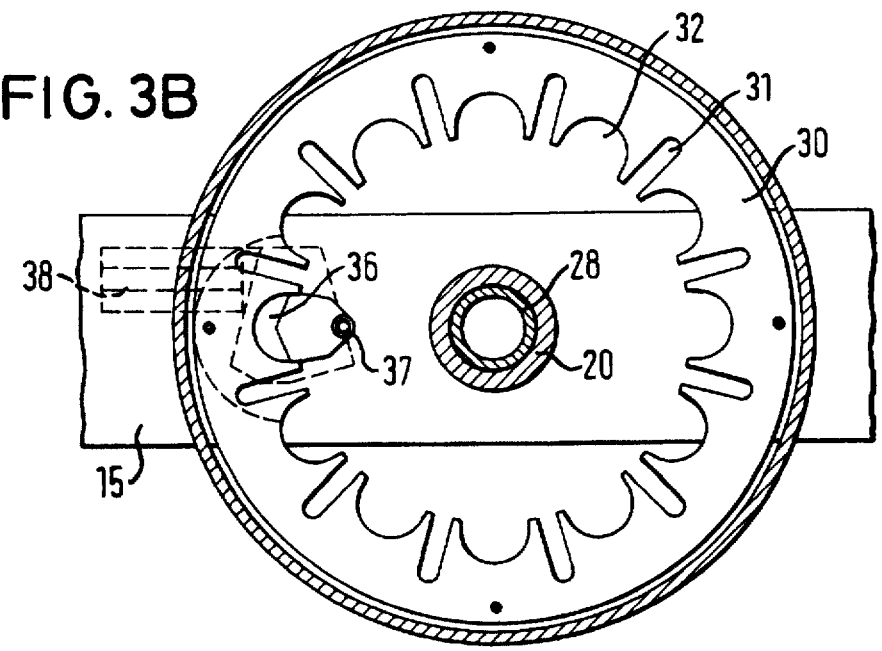

The functional process of a complete tool change is described below with reference to FIG. 2, which shows the working range of the machine tool through four end positions of tool 23. It is assumed that a machining operation on a work piece clamped on work table 5 has been concluded and tool 23a used in that operation is to be replaced by another tool 23b. For this changing operation, milling head 12 travels in the direction of arrow 40 into the still empty tool mount of first tool magazine 16, which is in the changing position, approximately in the position illustrated here. During this approaching motion or even after reaching the position illustrated here, the working spindle is brought by a vertical movement of milling head 12 to a height at which the ring collar, on the nose of the tool, is at the same height as tool mount 22. This is followed by an insertion movement on the radial coordinate, which is indicated with a dash-dot line in FIG. 2, until the ring collar on the nose of the tool comes in contact with the support shoulders formed in tool mount 22 and the devices for centering the tool and for preventing it from turning are activated. With an appropriate control command, the gripper inside the spindle is released from the nose of the tool and working spindle 13, together with vertical head 12, execute a vertical movement whose end position is illustrated in FIG. 1. To receive the new tool 23b, there is a horizontal movement of the working spindle in the direction of arrow 41 until the spindle axis is positioned exactly above the axis of new tool 23b. After a vertical lowering movement and activation of the gripper, the nose of new tool 23b is secured in the working spindle. After a short vertical releasing movement, the working spindle, together with new tool, is advanced in the direction of the arrow on the radial coordinate of second magazine 17 and thus the nose of tool 23b is extracted radially from its tool mount. This completes a tool change and the working spindle can be moved into the new working position in the usual way.

This invention is not limited to the design illustrated here. For example, instead of two disk magazines 16, 17 used here, it is also possible to use just a single magazine. For example, a chain magazine may be employed, where only every second tool mount may contain a tool, so it is possible to arrange the used tools directly next to a new tool in the magazine, which yields the desired short traversing path of the working spindle in a changing operation. In addition, other designs or modifications are also possible. For example, instead of the Geneva gearing used here, other types of drives can also be used for a stepping or continuous rotational or traversing movement of the magazine.

What is claimed is:

1. A programmable machine tool with automatic tool changing, said machine tool comprising:
    a stationary machine column;
    a cross slide that can be driven in two horizontal coordinates on the machine column;
    a vertical milling head that can be driven on the cross slide in the vertical coordinate;
    a working spindle on said vertical milling head;
    a work table mounted on the machine column;
    a supporting structure mounted to said machine column;
    tool magazine means with vertically aligned tools and a changing station arranged in the approach area of the milling head, said tool magazine means comprising two generally horizontally aligned disk magazines mounted together on one side of said working area next to said work table on said supporting structure, one of said disk magazines being configured to receive the used tool from said working spindle, the other said disk magazine being shaped and configured for changing to a new tool in said working spindle; and
    a programmable control unit.

2. The machine tool recited in claim 1, wherein said supporting structure is a rigid horizontal support cantilevered forward and is rigidly mounted on the front side of said machine columns, so said two disk magazines are mounted one after the other on said support so they can rotate separately.

3. The machine tool recited in claim 2, wherein each said disk magazine comprises:
    a column; and
    a magazine disk having a plurality of tool mounts, said magazine disks being mounted on the upper end of said column;
    said machine tool further comprising a drive unit mounted to said supporting structure, said drive unit acting on said column to rotate said magazine disk step by step about an angle of rotation that is determined by the number of said tool mounts.

4. The machine tool recited in claim 3, wherein said column is hollow and is mounted for rotation on a vertical tubular bar secured at its lower end in said supporting structure.

5. The machine tool recited in claim 4, wherein said drive unit contains Geneva gearing having a ring wheel mounted in the end of said column adjacent said supporting structure, and having a drive link and a motor in said supporting structure.

6. The machine tool recited in claim 5, and further comprising a console mounted in a recess in said machine column, said console being rotatable about a 45° angle axis from said recess, said work table being rotatably mounted on said console.

7. The machine tool recited in claim 4, and further comprising a console mounted in a recess in said machine column, said console being rotatable about a 45° angle axis from said recess, said work table being rotatably mounted on said console.

8. The machine tool recited in claim 3, wherein said drive unit contains Geneva gearing having a ring wheel mounted in the end of said column adjacent said supporting structure, and having a drive link and a motor in said supporting structure.

9. The machine tool recited in claim 8, and further comprising a console mounted in a recess in said machine column, said console being rotatable about a 45° angle axis from said recess, said work table being rotatably mounted on said console.

10. The machine tool recited in claim 3, and further comprising a console mounted in a recess in said machine column, said console being rotatable about a 45° angle axis from said recess, said work table being rotatably mounted on said console.

11. The machine tool recited in claim 2, and further comprising a console mounted in a recess in said machine column, said console being rotatable about a 45° angle axis from said recess, said work table being rotatably mounted on said console.

12. The machine tool recited in claim 1, wherein each said disk magazine comprises:
    a column; and
    a magazine disk having a plurality of tool mounts, said magazine disks being mounted on the upper end of said column;
    said machine tool further comprising a drive unit mounted to said supporting structure, said drive unit acting on said column to rotate said magazine disk step by step about an angle of rotation that is determined by the number of said tool mounts.

13. The machine tool recited in claim 12, wherein said column is hollow and is mounted for rotation on a vertical tubular bar secured at its lower end in said supporting structure.

14. The machine tool recited in claim 13, wherein said drive unit contains Geneva gearing having a ring wheel mounted in the end of said column adjacent said supporting structure, and having a drive link and a motor in said supporting structure.

15. The machine tool recited in claim 14, and further comprising a console mounted in a recess in said machine column, said console being rotatable about a 45° angle axis from said recess, said work table being rotatably mounted on said console.

16. The machine tool recited in claim 13, and further comprising a console mounted in a recess in said machine column, said console being rotatable about a 45° angle axis from said recess, said work table being rotatably mounted on said console.

17. The machine tool recited in claim 12, wherein said drive unit contains Geneva gearing having a ring wheel mounted in the end of said column adjacent said supporting structure, and having a drive link and a motor in said supporting structure.

18. The machine tool recited in claim 17, and further comprising a console mounted in a recess in said machine column, said console being rotatable about a 45° angle axis from said recess, said work table being rotatably mounted on said console.

19. The machine tool recited in claim 12, and further comprising a console mounted in a recess in said machine column, said console being rotatable about a 45° angle axis from said recess, said work table being rotatably mounted on said console.

20. The machine tool recited in claim 1, and further comprising a console mounted in a recess in said machine column, said console being rotatable about a 45° angle axis from said recess, said work table being rotatably mounted on said console.

21. A programmable machine tool with automatic tool changing, said machine tool comprising:

a stationary machine column;

a cross slide that can be driven in two horizontal coordinates on the machine column;

a vertical milling head that can be driven on the cross slide in the vertical coordinate;

a working spindle on said vertical milling head;

a work table mounted on the machine column;

a supporting structure mounted to said machine column;

tool magazine means with vertically aligned tools and a changing station arranged in the approach area of the milling head, said tool magazine means comprising two disk magazines mounted together on one side of said working area next to said work table on said supporting structure, one of said disk magazines being configured to receive the used tool from said working spindle, the other said disk magazine being shaped and configured for changing to a new tool in said working spindle wherein the changing position of each said disk magazine is arranged on a radial coordinate that forms an angle of 45° with the line connecting the two center points of said magazines; and a programmable control unit.

22. The machine tool recited in claim 21, wherein said supporting structure is a rigid horizontal support cantilevered forward and is rigidly mounted on the front side of said machine column, so said two disk magazines are mounted one after the other on said support so they can rotate separately.

23. The machine tool recited in claim 22, wherein each said disk magazine comprises:

a column; and a magazine disk having a plurality of tool mounts, said magazine disks being mounted on the upper end of said column;

said machine tool further comprising a drive unit mounted to said supporting structure, said drive unit acting on said column to rotate said magazine disk step by step about an angle of rotation that is determined by the number of said tool mounts.

24. The machine tool recited in claim 23, wherein said cylindrical column is hollow and is mounted for rotation on a vertical tubular bar secured at its lower end in said supporting structure.

25. The machine tool recited in claim 24, wherein said drive unit contains Geneva gearing having a ring wheel mounted in the end of said column adjacent said supporting structure, and having a drive link and a motor in said supporting structure.

26. The machine tool recited in claim 25, and further comprising a console mounted in a recess in said machine column, said console being rotatable about a 45° angle axis from said recess, said work table being rotatably mounted on said console.

27. The machine tool recited in claim 24, and further comprising a console mounted in a recess in said machine column, said console being rotatable about a 45° angle axis from said recess, said work table being rotatably mounted on said console.

28. The machine tool recited in claim 23, wherein said drive unit contains Geneva gearing having a ring wheel mounted in the end of said column adjacent said supporting structure, and having a drive link and a motor in said supporting structure.

29. The machine tool recited in claim 28, and further comprising a console mounted in a recess in said machine column, said console being rotatable about a 45° angle axis from said recess, said work table being rotatably mounted on said console.

30. The machine tool recited in claim 23, and further comprising a console mounted in a recess in said machine column, said console being rotatable about a 45° angle axis from said recess, said work table being rotatably mounted on said console.

31. The machine tool recited in claim 22, and further comprising a console mounted in a recess in said machine column, said console being rotatable about a 45° angle axis from said recess, said work table being rotatably mounted on said console.

32. The machine tool recited in claim 21, wherein each said disk magazine comprises:

a column; and a magazine disk having a plurality of tool mounts, said magazine disks being mounted on the upper end of said column;

said machine tool further comprising a drive unit mounted to said supporting structure, said drive unit acting on said column to rotate said magazine disk step by step about an angle of rotation that is determined by the number of said tool mounts.

33. The machine tool recited in claim 22, wherein said drive unit contains Geneva gearing having a ring wheel mounted in the end of said column adjacent said supporting structure, and having a drive link and a motor in said supporting structure.

34. The machine tool recited in claim 33, and further comprising a console mounted in a recess in said machine column, said console being rotatable about a 45° angle axis from said recess, said work table being rotatably mounted on said console.

35. The machine tool recited in claim 32, and further comprising a console mounted in a recess in said machine column, said console being rotatable about a 45° angle axis from said recess, said work table being rotatably mounted on said console.

36. The machine tool recited in claim 21, wherein said cylindrical column is hollow and is mounted for rotation on a vertical tubular bar secured at its lower end in said supporting structure.

37. The machine tool recited in claim 36, wherein said drive unit contains Geneva gearing having a ring wheel mounted in the end of said column adjacent said supporting structure, and having a drive link and a motor in said supporting structure.

38. The machine tool recited in claim 37, and further comprising a console mounted in a recess in said machine column, said console being rotatable about a 45° angle axis from said recess, said work table being rotatably mounted on said console.

39. The machine tool recited in claim 36, and further comprising, a console mounted in a recess in said machine column, said console being rotatable about a 45° angle axis from said recess, said work table being rotatably mounted on said console.

40. The machine tool recited in claim 21, and further comprising a console mounted in a recess in said machine column, said console being rotatable about a 45° angle axis from said recess, said work table being rotatably mounted on said console.

* * * * *